United States Patent [19]

Haney et al.

[11] Patent Number: 4,830,119
[45] Date of Patent: May 16, 1989

[54] TOP HEAD DRIVE COOLING SYSTEM

[75] Inventors: Keith M. Haney; Clyde A. Willis, both of Portage, Mich.

[73] Assignee: 501 W-N Apache Corporation, Wichita Falls, Tex.

[21] Appl. No.: 228,329

[22] Filed: Aug. 4, 1988

Related U.S. Application Data

[63] Continuation-in-part of Ser. No. 34,481, Apr. 2, 1987, abandoned.

[51] Int. Cl.$^4$ ............................................. E21B 15/00
[52] U.S. Cl. ...................................... 173/21; 173/147; 173/171; 137/580
[58] Field of Search .................... 173/20, 21, 147, 151, 173/171; 175/40; 277/DIG. 7; 464/17, 88, 173, 183; 73/151.5; 137/580; 98/DIG. 7; 165/115.4, 47; 55/294; 15/312

[56] References Cited

U.S. PATENT DOCUMENTS

| | | | |
|---|---|---|---|
| 3,011,502 | 12/1961 | Jordan | 137/580 |
| 3,018,503 | 1/1962 | Hijiya et al. | 98/115.4 |
| 3,545,180 | 12/1970 | Schrag | 137/580 |
| 3,651,871 | 3/1972 | Greene | 173/21 |
| 3,820,446 | 6/1974 | Granbom et al. | 92/88 |
| 3,913,470 | 10/1975 | Cullen | 137/580 |
| 4,057,258 | 11/1977 | Ernst et al. | 277/DIG. 7 |

FOREIGN PATENT DOCUMENTS

| | | | |
|---|---|---|---|
| 533086 | 10/1953 | Belgium | 173/21 |
| 1002459 | 3/1983 | U.S.S.R. | 173/21 |

OTHER PUBLICATIONS

Drawings A, B, C.

Primary Examiner—Frank T. Yost
Assistant Examiner—James L. Wolfe
Attorney, Agent, or Firm—Willian Brinks Olds Hofer Gilson & Lione, Ltd.

[57] ABSTRACT

A top head drive cooling system is provided for an earth drilling machine of the type having a mast, a top head drive assembly mounted for movement along the mast, a quill included in the top head drive assembly, and an electric motor for rotating the quill. This cooling system includes an air duct mounted to the mast and defining a slot extending along the mast. The slot is sealed by a pair of flexible resilient lips which bridge the slot, and a blower is situated at ground level to blow cooling air into the air duct. A conduit is provided on the top head drive assembly, and the conduit extends between the lips into the air duct and conducts air from the air duct to the electric motor. The portion of the conduit which extends into the air duct is preferably tapered at both ends in order to provide a sliding seal against the lips. A position measuring system is coupled to the conduit and is positioned within the air duct.

27 Claims, 4 Drawing Sheets

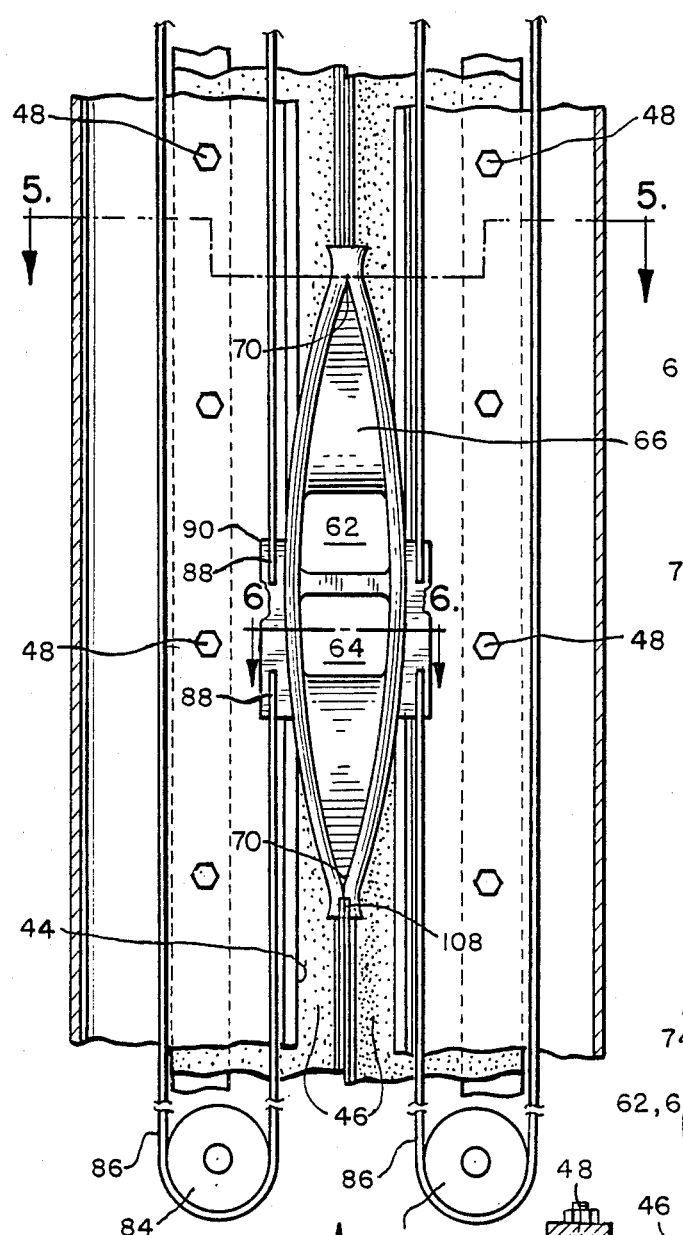
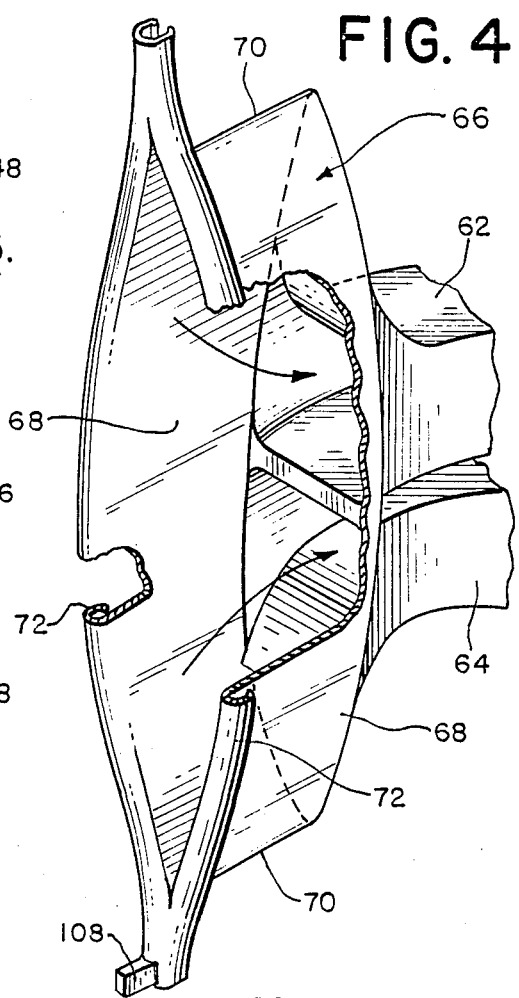
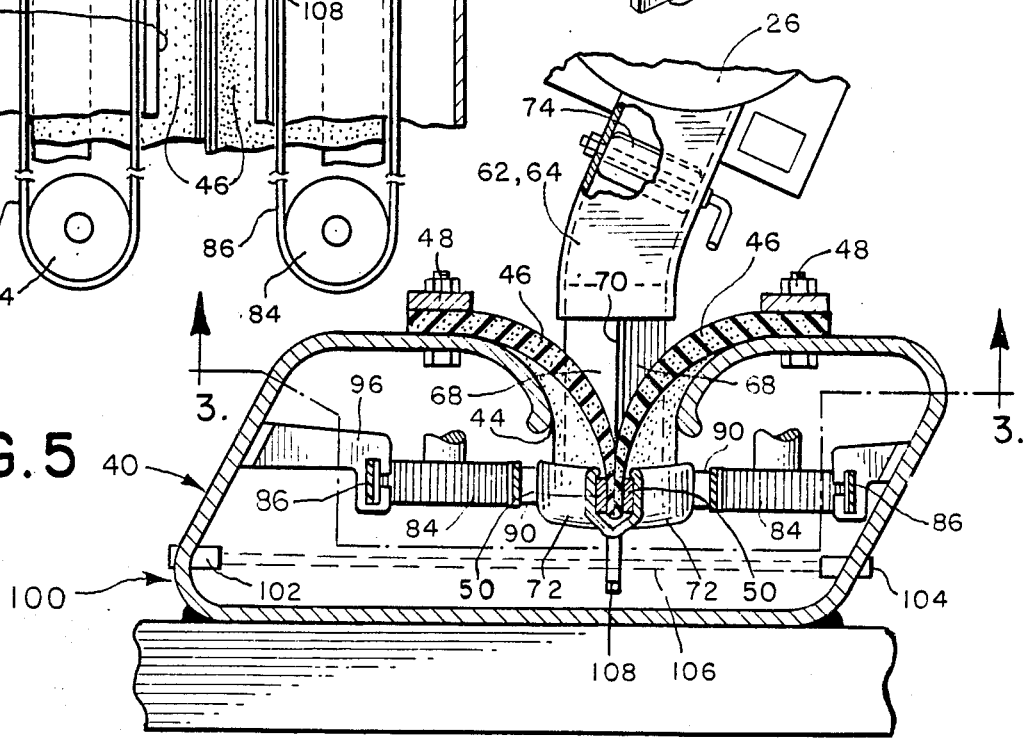

TOP HEAD DRIVE COOLING SYSTEM

CROSS REFERENCE TO RELATED APPLICATIONS

This application is a continuation-in-part of U.S. patent application Ser. No. 07/034,481, filed Apr. 2, 1987, now abandoned.

BACKGROUND OF THE INVENTION

This invention relates to a cooling system for an electric motor mounted in a top head drive assembly of an earth drilling machine, wherein the cooling system is integrated with a position measuring system for the top head drive assembly.

One class of increasingly important earth drilling machines utilizes a top head drive assembly which is mounted for movement along a mast. The top head drive assembly includes a quill which supports and rotates a string of down hole tubulars such as drill pipe. The quill is rotated by a transmission which is in turn powered by one or more electric motors. Such top head drive assemblies provide important advantages in terms of high speed, efficient operation with flexible and ready control over the torque applied to the quill. However, electric motors of the size used in top head drive assemblies generate substantial amounts of heat, and they must be actively cooled. Generally, this cooling is performed by forcing large volumes of air throughout the motor frame.

In the past, at least three approaches have been used to cool electric motors used to rotate a string of down whole tubulars. The first is simply to mount a centrifugal blower directly adjacent to the electric motor to blow air through the motor for cooling purposes. Typically, a spark arrester is provided to reduce the danger of explosion. This first approach is not suitable for use in environments in which explosive gas-air mixtures may be present in the vicinity of the electric motor. In particular, in many earth drilling operations natural gas may escape from the bore hole formed by the earth drilling machine and may rise to the region of the top head drive assembly. A blower mounted directly on the top head drive assembly may in this instance blow a potentially explosive mixture of natural gas and air into the motor with possibly catastrophic results.

A second approach used in the past is to situate an electric blower remotely from the top head drive assembly and to connect the blower with the top head drive assembly by means of a flexible air duct. A flexible air duct is used because the top head drive assembly moves up and down the mast and a rigid air duct coupled between the blower and the top head drive assembly is therefore not feasible. Typically, the blower is positioned at some distance away from the bore hole in order to minimize the possibility that the blower will blow natural gas into the motor.

A third approach of the prior art is to provide a heat exchanger on the top head drive assembly and to supply a chilled liquid coolant to the heat exchanger to remove heat from the closed loop motor circulating air. This approach brings with it the disadvantages of a liquid cooling system with the need for supplying chilled liquid coolant and for maintaining the heat exchanger.

The present invention is directed to an improved top head drive cooling system which to a large extent overcomes the disadvantages of the prior art approaches described above.

As earth drilling machines are becoming more automated, it is increasingly important to be able to measure the position and velocity of the top head drive assembly along the mast accurately and reliably. This can be difficult to achieve, for the earth drilling environment is hostile to many types of precision measuring instruments. For example, drilling mud can coat an optical sensor or light source and render it inoperative. Furthermore, belts and other types of tension members can easily be damaged by drilling hardware.

The present invention is directed to an improved top head drive cooling system which is integrated with a top head drive position measuring system to provide a high level of physical protection to the measuring system at a low additional cost.

SUMMARY OF THE INVENTION

According to this invention an earth drilling machine of the type described above is provided with an air duct mounted to the mast. This air duct defines a slot extending parallel to the drilling axis. Means are provided for sealing the slot, and the sealing means includes a least one and preferably two flexible, resilient lips. Means are provided for blowing air into the air duct, and this blowing means is typically situated at ground level at some distance from the drilling axis. Conduit means are mounted to travel with the top head drive assembly to conduct air from the air duct to the electrical motor means of the top head drive assembly in order to cool the electric motor means. This conduit means extends past the lip into the air duct and comprises means for spreading the lip in front of the conduit means as the top head drive assembly moves along the mast. The spreading means cooperates with the lip to form a sliding seal between the conduit means an the air duct. Means for measuring the position of the conduit means and therefore the top head drive assembly along the air duct is mounted at least in part in the air duct such that the air duct provides physical protection to the measuring means.

The air duct of this invention eliminates the need for a flexible air duct traveling with the top head drive assembly. The sliding seal between the conduit means and the lip of the air duct minimizes the leakage of air out of the air duct and yet allows the conduit means to move along the length of the air duct and to provide cooling air to the electric motor means regardless of the position of the top head drive assembly along the mast. The measuring system of this position provides a reliable measure of the position and optionally the velocity of the top head drive assembly. Because the measuring system is protected by the air duct, optical sensors and position measuring systems that use relatively easily damaged tension members such as closed loop belts can be used reliably, without concern for damage by drilling mud or the like. The preferred embodiment described below is relatively simple and inexpensive to manufacture and is reliable in operation.

The invention itself, together with further objects and attendant advantages, will best be understood by reference to the following detailed description, taken in conjunction with the accompanying drawings.

BRIEF DESCRIPTION OF THE DRAWINGS

FIG. 3 is a cross-sectional view taken along line 3—3 of FIG. 5.

FIG. 4 is a perspective vie in partial cutaway of a of the embodiment of FIG. 1.

FIG. 5 is a cross-sectional view taken along line 5—5 of FIG. 3.

DETAILED DESCRIPTION OF THE PRESENTLY PREFERRED EMBODIMENTS

Figure 1:
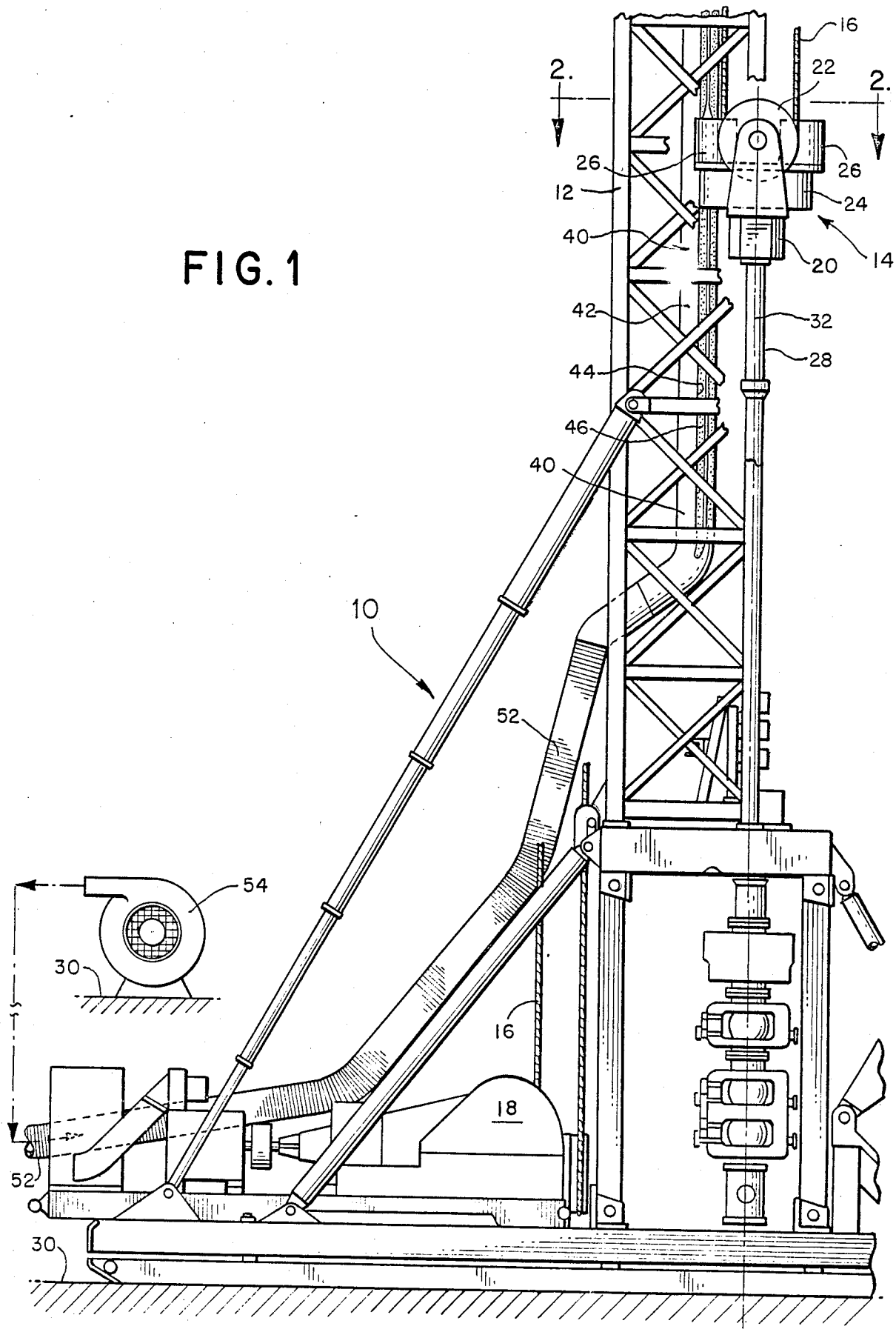
FIG. 1 is a side elevation of an earth drilling machine incorporates a presently preferred embodiment of this invention.

Turning now to the drawings, FIG. 1 shows a side elevation of a drilling machine 10 which incorporates a presently preferred embodiment of the top head drive cooling system of this invention. This drilling machine 10 includes a vertical mast 12 which guides the movement of a top head drive assembly 14 along a drilling axis 32. The drilling machine 10 includes a draw works 18 which controls the position of a cable 16 that supports the top head drive assembly 14 in place on the mast 12.

The top head drive assembly 14 includes a load beam 20 which is supported by sheaves 22 which are in turn supported by the cable 16. The load beam 20 supports a transmission 24 which is powered by a pair of electric motors 26. Preferably, these electric motors 26 are DC shunt wound motors such as General Electric Model 761 or 752. The top head drive assembly 14 includes a quill 28 which is rotated by the electric motors 26 via the transmission 24. In the conventional manner, down hole tubulars such as drill pipe or casing are supported and rotated by the quill 28. In FIG. 1, reference numeral 30 is used to indicate ground level.

The foregoing components of the drilling machine 10 are conventional and form no part of this invention. These components have been described merely to clarify the environment of the present invention, and for this reason no further details will be provided here. Further details of the top head drive assembly 14 can be found in U.S. patent application Ser. Nos. 07/034,483 and 07/035,021.

According to this invention a top head drive cooling system is provided which includes an air duct 40. This air duct 40 extends along the mast, parallel to the drilling axis 32. The air duct 40 includes a box structure 42 which is rigid and is rigidly mounted in place on the mast 12. This box structure 42 defines a slot 44 which is oriented parallel to the axis 32 and extends over the full range of travel of the top head drive assembly 14 in the mast 12.

As shown in FIGS. 2, 3, 5 and 6, the slot 44 is sealed by a pair of flexible resilient lips 46 which may, for example, be formed of an elastomeric material. These lips 46 are secured at their outer edges by fasteners 48 to the box structure 42. The lips preferably taper toward their inner edges as shown in FIG. 5. If desired, magnetic strips 50 which are flexible and resilient can be mounted on the inner edges of the lips 46 so as to hold the lips 46 in the sealing position shown in FIG. 5. In this position, the lips 46 substantially seal the slot 44.

The lower end of the air duct 40 is connected by means of a flexible duct 52 with a blower 54 situated at an adequate distance from the bore hole. In this embodiment the blower 54 is situated at ground level 30 (FIG. 1). The blower 54 is a conventional centrifugal blower in this embodiment, and it operates to blow air via the flexible duct 52 into the air duct 40. The air duct 40 is preferably closed off at its upper end.

Figure 2:
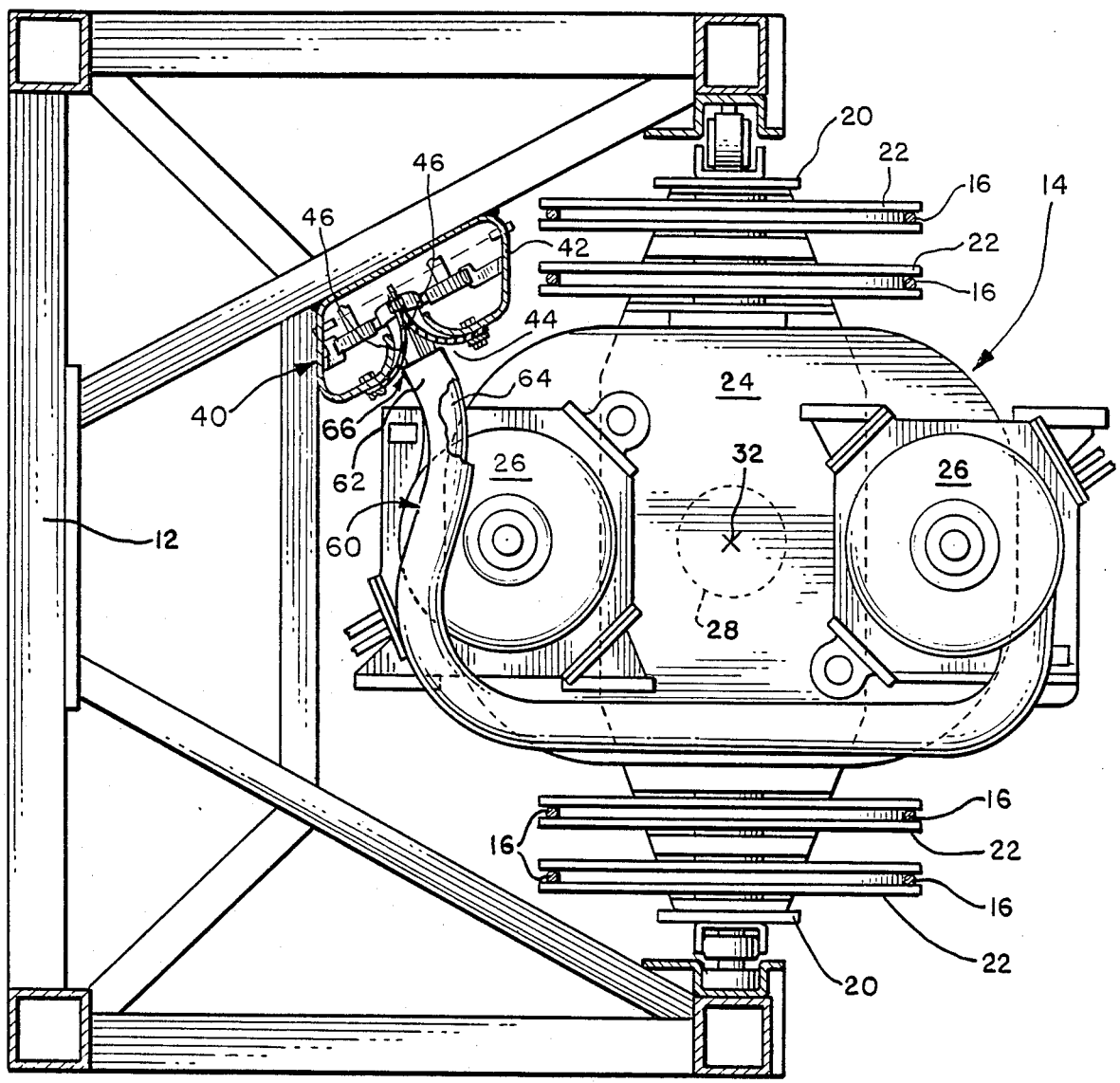
FIG. 2 is a cross-sectional view taken along line 2—2 of FIG. 1.
Figure 6:
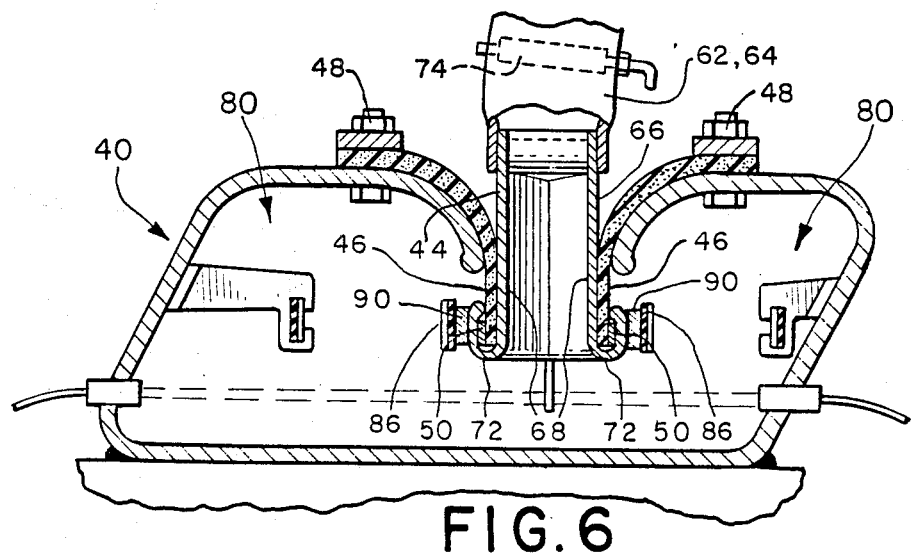
FIG. 6 is a cross-sectional view taken along line 6—6 of FIG. 3.

As best shown in FIG. 2, the top head drive assembly 14 supports a conduit 60. In this embodiment, the conduit 60 is formed of sheet metal and is a rigid structure which is rigidly mounted to the top head drive assembly 14. The conduit 60 defines an upper passageway 62 and a lower passageway 64, each of which terminates at the cooling air inlet of a respective one of the two electric motors 26. The upper and lower passageways 62, 64 also are connected to a seal member 66 which protrudes between the lips 46 into the interior of the air duct 40 (FIG. 6).

As best shown in FIG. 4, this seal member 66 includes a pair of side walls 68 which together form a tubular structure which is pointed at each end. The points 70 are aligned with the axis 32 and serve to spread the lips 46 and to allow the lips 46 to return to the sealing position of FIG. 5 as the seal member 66 moves along the axis 32 with the top head drive assembly 14. As best shown in FIGS. 4–6, the side walls 68 each define a recurved edge 72 which wraps around the inner edge of a respective one of the lips 46. In this way, the lips 46 are grasped by the side walls 68 so as to be positively restored into the sealing position of FIG. 5.

The upper and lower passageways 62, 64 differ in length, and are preferably of varying depths in order to ensure that an equal volume of cooling air flows to each of the electric motors 26. A balancing damper 74 is provided in the lower passageway 64 in order to balance the air flow in the two passageways 62, 64 (FIG. 6).

The cooling system described above operates as follows. The blower 54 blows cooling air via the flexible duct 52 into the air duct 40. The air duct 40 conducts the cooling air to the seal member 66. The seal member 66 directs the cooling air into the upper and lower passageways 62, 64, which conduct the cooling air to the conventional cooling air inlets of the electric motors 26. The lips 46 seal the slot 44 both in the region of the seal member 66 and along the remaining length of the slot 44. In this way, cooling air is substantially prevented from leaking out of the air duct 40.

As the top head drive assembly 14 is moved along the length of the mast 12, the seal member 66 slides along the length of the slot 44. Regardless of the position of the top head drive assembly 14 in the mast 12, the lips 46 cooperate with the seal member 66 to form a sliding seal. In this way, the need for a flexible duct which moves with the top head drive assembly is eliminated. However, because the blower 54 is situated at ground level remotely from the drilling axis 32, the possibility of blowing an explosive mixture of natural gas and air into the electric motors 26 is substantially eliminated. All of these advantages are achieved with a simple, reliable, efficient system that completely avoids the need for liquid coolants, heat exchangers, and the like.

According to this invention, several redundant position measuring systems are mounted within the air duct 40 to measure the position and velocity of the conduit 60 and therefore the to head drive assembly 14. Because these measuring systems are mounted within the air duct 40, they are protected from contact with drilling mud, and they are physically protected from damage due to moving objects and the like. By integrating the position measuring systems described below with the cooling system described above, a high degree of physical protection is provided for the measuring systems at substantially no increased cost.

Figure 7:
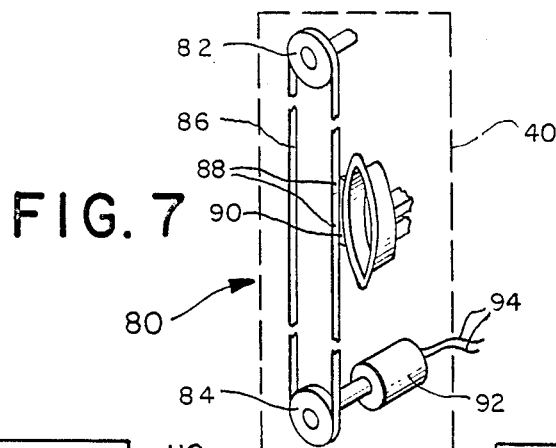
FIG. 7 is a schematic view of one of the continuously reading position measuring systems of the embodiment of FIG. 1.

As shown for example in FIGS. 5, 6 and 7, the measuring systems of this embodiment include two continuous position measuring systems 80. The two systems in this embodiment are identical, and for convenience the same reference numerals are used for corresponding elements of both.

As shown most clearly in FIG. 7, each of the measuring systems 80 includes an upper sprocket 82 and a lower sprocket 84, both mounted for rotation within the air duct 40. The upper sprocket 82 is mounted near the top of the air duct 40 in a position where the conduit 60 never comes into contact with the upper sprocket 82, even when the top head drive assembly 14 is in its uppermost position. Similarly, the lower sprocket 84 is mounted near the bottom of the air duct 40, below the lowermost point reached by the conduit 60.

A measuring belt 86 defining two ends 88 is mounted to the recurved edge 72 of the conduit 60 by means of a bracket 90. The belt 86 forms a closed loop which extends upwardly from the conduit 60 around the upper sprocket 82 and downwardly from the conduit 60 around the lower sprocket 84. A snubber 96 is mounted to the interior o the air duct 40 to limit undesired movement of the belt 86 transverse to the longitudinal axis of the air duct 40.

As shown in FIG. 7, a shaft angle encoder 92 is mounted to the lower sprocket 84. The shaft angle encoder 92 can for example be a conventional incremental or absolute encoder, and it produces signals on leads 94 indicative of both tee angular position and the rotational velocity of the lower sprocket 84.

As the conduit 60 moves axially along the air duct 40, the measuring belt 86 causes the upper and lower sprockets 82, 84 to rotate such that the position and velocity of the lower sprocket 84 is directly correlated with the position and velocity of the conduit 60 and therefore of the top head drive assembly 14. Thus, the velocity and position signals generated by the encoder 92 provide an accurate and reliable measure of both the position and velocity of the top head drive assembly 14 along the mast 12.

It will be appreciated that the measuring belts 86, the encoders 92, and the sprockets 82, 84 are readily susceptible to physical damage. However, since these elements are positioned entirely within the air duct 40, the air duct 40 provides excellent protection and allows reliable operation. A further advantage of the disclosed placement of the continuous measuring system 80 within the air duct 40 is that the air temperature in the air duct 40 can be controlled within broad limits, as for example between 0° C. and 35° C. In this way, a less harsh environment can be maintained for the measuring system 80. Furthermore, the air flowing within the air duct 40 can be filtered to ensure that it is clean and substantially free of particulates, thereby providing a further degree of protection to the measuring system 80.

Of course, it should be understood that a wide variety of physical devices can be used for the sprockets 82, 84, the belts 86, and the encoders 92. For example, the term "belt" is intended to cover the full range of tension members, including chains, toothed belts, and pin timing belts. Similarly, the term "sprocket" is intended to cover the full range of sprockets, rollers, or sheaves that can cooperate with the belt. As mentioned above, the encoder 92 can be an absolute or an incremental encoder.

Furthermore, the continuous position measuring system is not limited to closed loop tension members. To the contrary, position and velocity measuring systems are available which utilize only a single stainless steel cable. See for example the position and velocity transducer provided by Celesco as transducer PT801. Using such a system a single tension member can be mounted axially to the lower end of the conduit 16, and coupled to a transducer positioned centrally at the bottom of the air duct 40.

Whatever the tension member used, it is important to keep axial elongation of the tension member within allowable limits as temperature and strain vary. For example, a thin, relatively hard and stiff elastomer reinforced by axially oriented glass or carbon fibers can be used.

As shown in FIGS. 5 and 6, there are two independent side-by-side position measuring systems 80, which provide a redundant measure of the position and velocity of the conduit 60. Preferably, a control system is provided (not shown) which compares the instantaneous position and velocity signals provided by the two encoders 92. In the event these signals at any point disagree with one another, the controller preferably responds by setting the draw works brakes and causing other appropriate safety steps to be taken.

Figure 8:
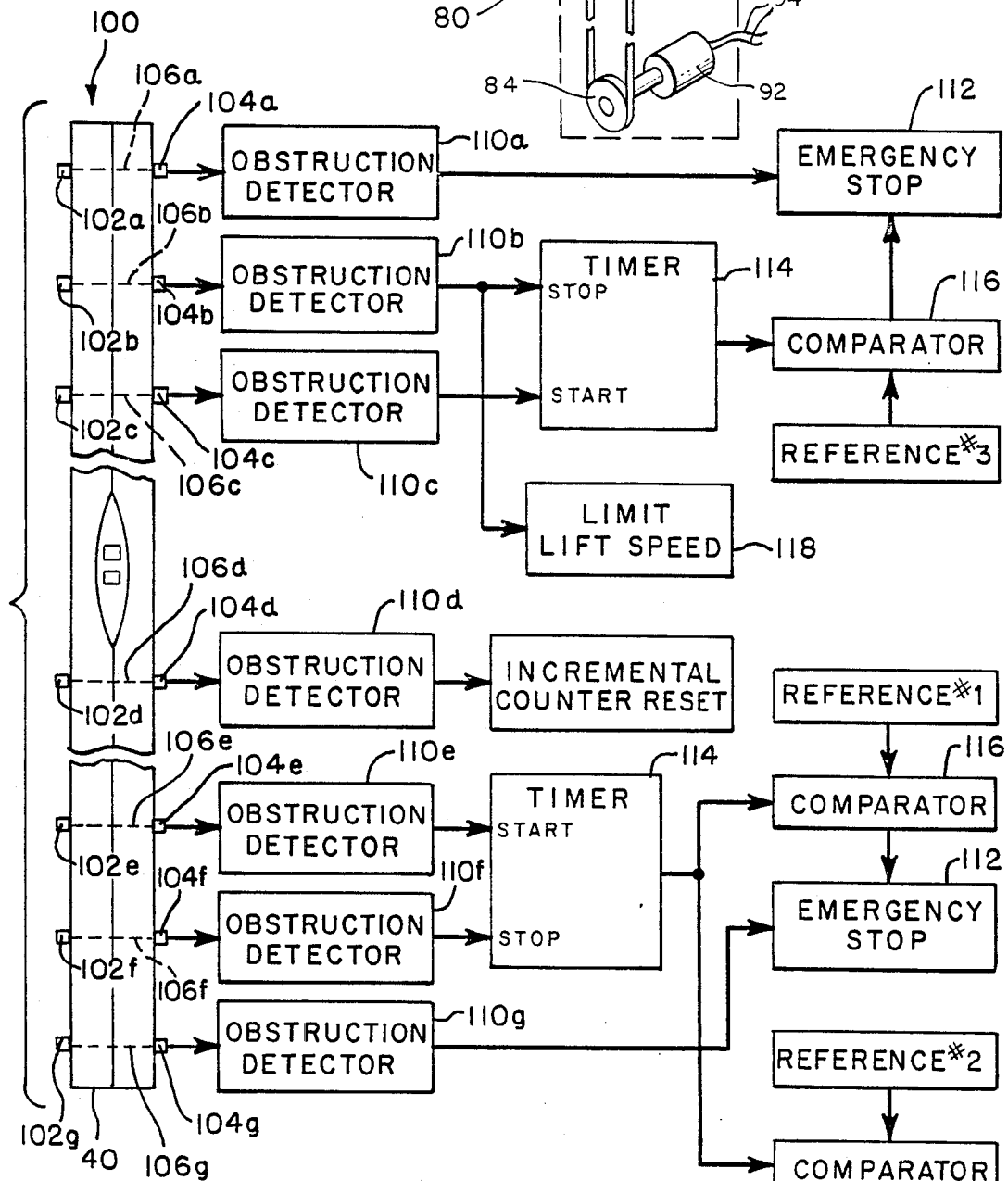
FIG. 8 is a schematic view of the optical switch position measuring system of the embodiment of FIG. 1.

In addition, the embodiments shown in the drawings include a light switch measuring system 100 as illustrated schematically in FIG. 8 and in part in FIGS. 5 and 6. As shown in FIG. 8, this light switch measuring system 100 includes a number of optical sources 102a-g, each of which is aligned with a respective optical receiver 104a-g. Each pair of sources and receivers defines a respective optical path 106a-g. The sources 102a-g and the receivers 104a-g are all mounted on the air duct 40 such that the optical paths 106a-g extend across the interior of the air duct 40 (FIGS. 5 and 6). An obstructor 108 is mounted to the conduit 60 such that the obstructor 108 obstructs each of the optical paths 106a-g when the conduit 60 is in a respective selected position along the length of the air duct 40. Otherwise, the optical paths 104a-g are unobstructed.

Because the sources 102a-g, receivers 104a-g, and obstructor 108 are all mounted within the air duct 40, the optical elements of the measuring system 100 are all protected from contacts with drilling mud and other contaminants as described above.

As shown in FIG. 8, the output signals generated by the receivers 104a-g are applied to respective obstruction detectors 110a-g. The detectors monitor the output signals generated by the receivers 104a-g to produce a two-state output that is in a first state when the obstructor 108 is obstructing the respective optical path 106a-g, and is in a second state a all other times. In effect, the output signals generated by the obstruction detectors 110a-g indicate when the obstructor 108 and therefore the top head drive assembly 14 is in any one of seven discrete positions.

The output signals generated by the obstruction detectors 110a–g can be used in many ways. For example, the output signal of any of the obstruction detectors 110a–g can be used to reset the encoders 92 in the event incremental encoders are used. In FIG. 8 the output signal generated by the obstruction decoder 110d is shown as being used to reset incremental counters used in the encoders 92.

Additionally, the output signals of the obstruction detectors 110a and 110g are used to provide crash protection. The optical path 106a is positioned at the uppermost limit of travel of the top head drive assembly 14, and the optical path 106g is positioned at the lowermost limit of travel of the top head drive assembly 14. In the event either the obstruction detector 110a or the obstruction 110g indicates that the obstructor 108 and therefore the top head drive assembly 14 has reached an extreme limit of intended travel, emergency stop procedures are initiated, as indicated at 112. Such emergency stop procedures include conventional steps such as setting the emergency brake in the event the top head drive is descending, or setting the draw works brake, releasing the draw works clutch, and stopping the draw works motor in the event the top head drive assembly 14 is being raised.

In addition, output signals of selected ones of the obstruction detectors 110a–g can be used to measure the average velocity of the top head drive assembly 14, and to initiate appropriate action. As shown in FIG. 8, timers 114 are started and stopped by the output signals of selected obstruction detectors 110b, c, e, f. The distance between the respective optical paths is selected such that the elapsed time between the selected pair of obstruction detector signals is indicative of the velocity of the top head drive assembly 14. The time measured by the timer 114 is then compared in a comparator 116 with a reference value. In the event the elapsed time is less than an extreme reference value (Reference No. 3 or Reference No. 1), indicating a dangerously high speed for the top head drive assembly, emergency stop procedures are initiated. Alternately, if the time measured by the timer 114 is low but not dangerously low (Reference No. 2) procedures can be initiated to slow the rate of descent of the top head drive assembly.

As yet another example, the output signal of selected obstruction detectors 110b can be used to impose limits on the lift speed of the top head drive assembly to ensure that the top head drive assembly 14 can be stopped before it reaches the crown of the mast.

These examples of the manner in which the position measuring signals generated by the obstruction detectors 110a–g can be used have been provided merely by way of example, and it will be understood that a wide variety of control and safety features can be implemented using these signals. In many applications it will be desirable to use redundant pairs of optical sources and receivers to ensure more failsafe operation. It should be understood that the control system partly shown in FIG. 8 has been illustrated merely for purposes of discussion. Those skilled in the art will recognize that a wide variety of hardware approaches can be used to implement the disclosed functions. For example, programmable controllers and computers can readily be programmed to perform the functions discussed above.

Of course, it should be understood that a wide range of changes and modifications can be made to the preferred embodiment described above. For example, the detailed configuration of the lips 46 and the conduit 60 can be modified to suit the specific application. In addition, a wide variety of incremental, absolute, continuous and intermittent position measuring systems can be substituted for those shown. It is therefore intended that the foregoing detailed description be regarded as illustrative rather than limiting, and that it be understood that it is the following claims, including all equivalents, which are intended to define the scope of this invention.

We claim:

1. In an earth drilling machine of the type comprising a mast, a top head drive assembly mounted for movement along an axis aligned with the mast, a quill included in the top head drive assembly, and electric motor means for rotating the quill, the improvement comprising:

an air duct mounted to the mast, said air duct defining a slot extending parallel to the axis;
   means for sealing the slot, said sealing means comprising at least one flexible lip;
   means for blowing air into the air duct;
   a conduit mounted to travel with the top head drive assembly and positioned t conduct air from the air duct to the electric motor means to cool the electric motor means, wherein said conduit extends past the lip into the air duct and is shaped to spread the lip in front of the conduit as the top head drive assembly moves along the mast and to form a sliding seal with the lip; and
   means, disposed at least in part in the air duct and coupled to the conduit, for measuring the position of the conduit and therefore the top head drive assembly along the axis.

2. The invention of claim 1 wherein the conduit comprises a tubular element having an elongated cross section, said tubular element defining a pair of opposed walls which converge together to form a pair of opposed points at opposed sides of the cross section, each of said points positioned to spread the lip.

3. The invention of claim 1 wherein the at least one lip comprises a pair of flexible lips, each mounted on a respective side of the slot.

4. The invention of claim 3 further comprising means for magnetically holding the lips together.

5. The invention of claim 4 wherein the magnetic holding means comprises at least one elongated flexible magnetic strip mounted to one of the lips.

6. The invention of claim 1 wherein the conduit is rigidly mounted to the top head drive assembly.

7. The invention of claim 1 wherein the conduit is shaped to restore the lip to a sealing position immediately adjacent to the conduit.

8. The invention of claim 7 wherein the conduit is shaped to grasp the lip to position the lip to the sealing position.

9. The invention of claim 1 wherein the position measuring means comprises:

upper and lower sprockets mounted for rotation within the air duct at upper and lower portions of the air duct;
   a measuring belt secured to the conduit and looped around the sprockets such that linear movement of the conduit along the air duct causes the sprockets to rotate; and
   means for measuring the position of one of the sprockets.

10. The invention of claim 1 wherein the position measuring means comprises:

a tension member secured to the conduit and disposed within the air duct to extend axially along the length of the air duct; and means for measuring the movement of the tension member and therefore the movement of the conduit along the length of the air duct.

11. The invention of claim 1 wherein the position measuring means comprises:

an optical measuring system which comprises a light source and a receptor mounted to define an optical path that extends across the interior of the air duct, said optical path positioned such that the conduit obstructs the light path when the conduit is positioned at a selected position along the length of the air duct; and means, responsive to the receptor, for determining when the conduit obstructs the optical path.

12. The invention of claim 11 wherein the optical path is provided to define a maximum upper position for the conduit along the air duct.

13. The invention of claim 11 wherein the optical path is positioned to define a minimum lower position for the conduit along the air duct.

14. The invention of claim 11 further comprising:

a second optical measuring system which comprises a second light source and a second receptor mounted to define a second optical light path that extends across the interior of the air duct, said second optical path positioned such that the conduit obstructs the second light path when the conduit is positioned at a selected position along the length of the air duct; and means, responsive to the receptors, for determining the velocity of the conduit along the air duct as the conduit travels between the selected positions.

15. The invention of claim 1 wherein the measuring means additionally measures the velocity of the conduit and therefore the top head drive assembly along the axis.

16. In an earth drilling machine of the type comprising a mast, a top head drive assembly mounted for movement along an axis aligned with the mast, a quill included in the top head drive assembly, and electric motor means for rotating the quill, the improvement comprising:

an air duct mounted to the mast, said air duct comprising a rigid box structure which defines an elongated slot facing the top head drive assembly and extending parallel to the axis along apportion of the mast which corresponds to a full range of travel of the top head drive assembly along the mast;

a blower mounted at ground level to blow air into the air duct;

a conduit rigidly mounted to the top head drive assembly and positioned to conduct cooling air to the electric motor means;

a pair of resilient, flexible lips, each mounted on a respective side of the slot such that the lips meet over the slot to seal the slot against escaping air;

a sliding seal member rigidly connected to the conduit and positioned to extend into the air duct between the lips to conduct cooling air from the air duct to the conduit, said sliding seal member being elongated in the direction of the axis and defining a point at each of two ends such that the seal member spreads the lips as the top head drive assembly moves along the mast and the lips form a sliding seal around the seal member; and means, disposed at least in part in the air duct and coupled to the conduit, for measuring the position of the conduit and therefore the top head drive assembly along the axis;

said air duct, lips, seal member and conduit cooperating to direct cooling air from the blower to the electric motor means.

17. The invention of claim 16 further comprising means for magnetically holding the lips together in sealing engagement with one another at the slot.

18. The invention of claim 16 wherein the seal member defines a plurality of recurved edges shaped to wrap around the lips to engage the lips and to urge the lips together adjacent to the sealing member.

19. The invention of claim 16 wherein the electric motor means comprises a pair of electric motors, and wherein the conduit defines a pair of passageways, each directing cooling air from the seal member to a respective one of the electric motors.

20. The invention of claim 19 wherein the conduit further comprises means for balancing the cooling air flow in the pair of passageways.

21. The invention of claim 16 wherein the position measuring means comprises:

upper and lower sprockets mounted for rotation within the air duct at upper and lower portions of the air duct;

a measuring belt secured to the conduit and looped around the sprockets such that linear movement of the conduit along the conduit causes the sprockets to rotate; and means for measuring the position of one of the sprockets.

22. The invention of claim 16 wherein the position measuring means comprises:

a tension member secured to the conduit and disposed within the air duct to extend axially along the length of the air duct; and means for measuring the movement of the tension member and therefore the movement of the conduit along the length of the air duct.

23. The invention of claim 16 wherein the position measuring means comprises:

an optical measuring system which comprises a light source and a receptor mounted to define an optical path that extends across the interior of the air duct, said optical path positioned such that the conduit obstructs the light path when the conduit is positioned at a selected position along the length of the air duct; and means, responsive to the receptor, for determining when the conduit obstructs the optical path.

24. The invention of claim 23 wherein the optical path is provided to define a maximum upper position for the conduit along the air duct.

25. The invention of claim 23 wherein the optical path is positioned to define a minimum lower position for the conduit along the air duct.

26. The invention of claim 23 further comprising:

a second optical measuring system which comprises a second light source and a second receptor mounted to define a second optical light path that extends across the interior of the air duct, said second optical path positioned such that the conduit obstructs the second light path when the conduit is positioned at a selected position along the length of the air duct; and means, responsive to the receptors, for determining the velocity of the conduit along the air duct as the conduit travels between the selected positions.

27. The invention of claim 1 wherein the measuring means additionally measures the velocity of the conduit and therefore the top head drive assembly along the axis.

* * * * *